United States Patent
Su et al.

(10) Patent No.: US 12,001,768 B1
(45) Date of Patent: Jun. 4, 2024

(54) ENHANCED GLITCH ESTIMATION IN VECTORLESS POWER ANALYSIS

(71) Applicant: Synopsys, Inc., Sunnyvale, CA (US)

(72) Inventors: Qing Su, Sunnyvale, CA (US); Pankaj Singla, Charkhi Dadri (IN); Solaiman Rahim, San Francisco, CA (US); Eduard Petrus Huijbregts, Eindhoven (NL); Stephan Houben, Heythuysen (NL)

(73) Assignee: SYNOPSYS, INC., Sunnyvale, CA (US)

( * ) Notice: Subject to any disclaimer, the term of this patent is extended or adjusted under 35 U.S.C. 154(b) by 0 days.

(21) Appl. No.: 17/411,578

(22) Filed: Aug. 25, 2021

Related U.S. Application Data

(60) Provisional application No. 63/070,044, filed on Aug. 25, 2020.

(51) Int. Cl.
*G06F 30/3312* (2020.01)
*G06F 30/3315* (2020.01)
*G06F 119/12* (2020.01)

(52) U.S. Cl.
CPC ...... *G06F 30/3312* (2020.01); *G06F 30/3315* (2020.01); *G06F 2119/12* (2020.01)

(58) Field of Classification Search
CPC ............ G06F 30/3312; G06F 30/3315; G06F 2119/12
See application file for complete search history.

(56) References Cited

U.S. PATENT DOCUMENTS

| | | | | |
|---|---|---|---|---|
| 6,075,932 A | * | 6/2000 | Khouja | G06F 30/33 716/109 |
| 10,302,698 B1 | * | 5/2019 | Zhang | G01R 31/3177 |
| 2021/0384901 A1 | * | 12/2021 | Bai | G01R 31/00 |

* cited by examiner

*Primary Examiner* — Jack Chiang
*Assistant Examiner* — Aric Lin
(74) *Attorney, Agent, or Firm* — LEWIS ROCA ROTHGERBER CHRISTIE LLP

(57) ABSTRACT

A method includes acquiring timing analysis data associated with a cell and activity data of one or more inputs of the cell, determining a glitch toggle rate for an output of the cell based on the activity data of the one or more inputs of the cell and the timing analysis data, and estimating a glitch power based on at least the glitch toggle rate.

18 Claims, 6 Drawing Sheets

ENHANCED GLITCH ESTIMATION IN VECTORLESS POWER ANALYSIS

CROSS-REFERENCE TO RELATED APPLICATIONS

The present application claims the benefit under 35 U.S.C. § 119(e) of U.S. Provisional Patent Application No. 63/070,044 filed on Aug. 25, 2020, which is incorporated herein by reference in its entirety for all purposes.

TECHNICAL FIELD

The present disclosure relates to power analysis. In particular, the present disclosure relates to enhanced glitch estimation in vectorless power analysis.

BACKGROUND

Power consumption is becoming one of the major issues in digital design. For advanced node designs, glitch power starts to emerge as one of the power components and its contribution is becoming more and more significant. A glitch transition is a non-functional transition, leading to logic levels that are not clocked into a flip-flop. Glitch transitions occur on combinational cell outputs and consume dynamic power.

Vector based power analysis (i.e., time based power analysis) on glitch transitions may be performed by providing simulation vectors (also referred to as "events") on the primary inputs. A simulation vector is a vector of transitions, precisely indicating at which time step a 0-to-1 transition and 1-to-0 transition is happening. Vector based power analysis can use timing delay information from the simulation vectors to identify the glitch transitions and calculate the respective glitch power.

SUMMARY

In one aspect, a method includes acquiring timing analysis data associated with a cell and activity data of one or more inputs of the cell, determining a glitch toggle rate for an output of the cell based on the activity data of the one or more inputs of the cell and the timing analysis data, and estimating a glitch power based on at least the glitch toggle rate.

In one aspect, a system includes a memory storing instructions and a processor, coupled with the memory and to execute the instructions. The instructions when executed cause the processor to acquire timing analysis data associated with a cell and activity data of one or more inputs of the cell, determine a glitch toggle rate for an output of the cell based on the activity data of the one or more inputs and the timing analysis data, and estimate a glitch power based on at least the glitch toggle rate.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1A:
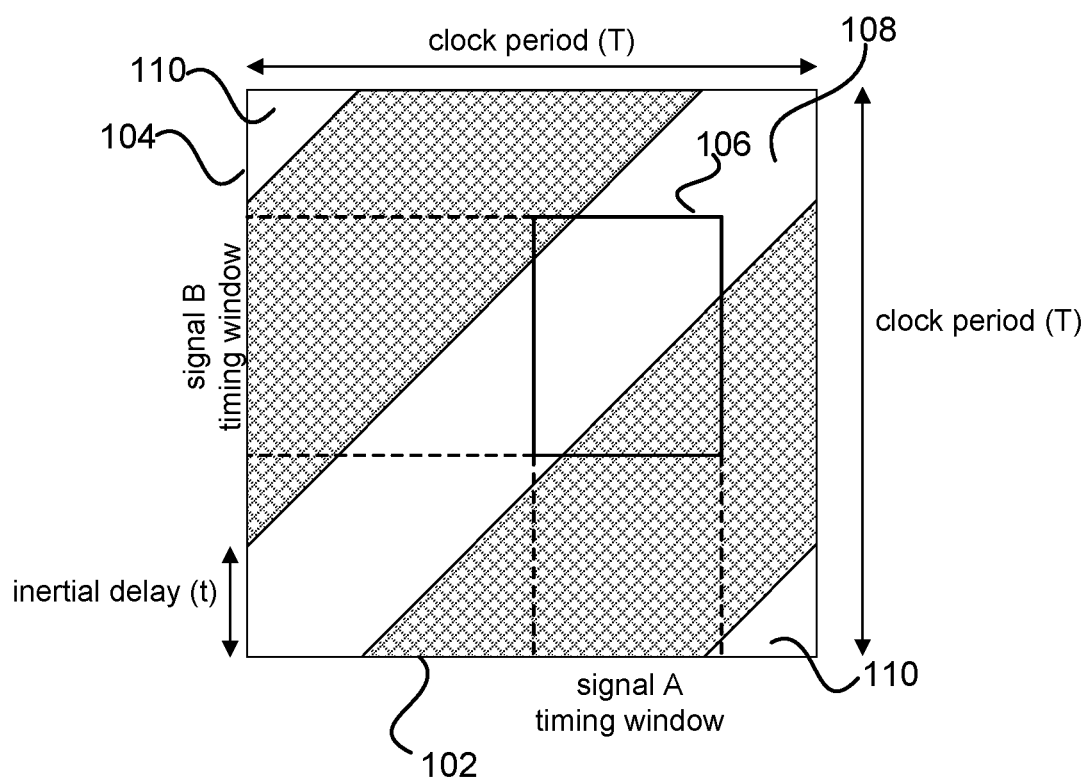
FIG. 1A illustrates a timing window, in accordance with an embodiment of the present disclosure.

In a digital design process, it is useful for designers at design stages prior to a sign-off stage (e.g., synthesis and placement, routing) to have the ability to analyze or estimate power, including glitch power, to put that into costing for power optimization. A power optimization may not give the optimal power costing but an improved result. One way to estimate glitch power is by vector based power analysis, which uses timing delay information from the simulation vectors to identify the glitch transitions and calculate the respective glitch power. However, this is normally not possible, as simulation vectors for the design are hard to generate or are not practically generated prior to the design being finalized. Described herein are systems and methods to estimate glitch power in a vectorless power analysis.

In vectorless power analysis, simulation vectors on a primary input or on any net are not generated. Instead, switching activities may be available. In some embodiments, only switching activities are available. Switching activities include statistics indicating how active each net is. For example, the switching activities may include the number of signal switches from one state to another (e.g., signal switches from 0 to 1 or vice versa). The switching activities may be expressed in terms of a toggle rate (i.e., number of transitions per unit time) and a static probability (i.e., percentage of time the signal being binary 1 out of the whole simulation time). The switching activities for each net may be available (e.g., acquired from a file).

A vectorless power analysis includes calculating leakage and dynamic power based on the switching activities. The vectorless power analysis may also include glitch power estimation as described further below. In some embodiments, flip-flops or registers are assumed to be glitch filters. Glitch transitions do not go through the registers because register outputs are clocked. Thus, glitch transitions at an input of a register are not propagated to an output of the register. But for combinational cells, glitch transitions can be propagated to and also generated at output pins. The methods and systems described herein estimate the glitch toggles at output. Each combination cell, with input activities, and corresponding arrival time information, together with clock period, cell delay is analyzed. Hence, the glitch power at each combination cell is estimated. Vectorless glitch power analysis may be performed at any design stage.

Glitches typically occur due to (re-)convergence in a logic cone, where the arrival of transitions in one branch comes earlier than in another branch of the logic cone, thereby creating transitions at the output that are only temporary in nature.

Glitches may include transport glitches and inertial glitches. A transport glitch (i.e., hazard) may cause the signal to make a complete 0-1-0 or 1-0-1 transition. An inertial glitch may cause the signal to make an incomplete 0-X-0 or 1-X-1 transition where X is a value between zero and one (i.e., 0<X<1).

Glitches consume power. In some situations, the power can be considerable and may be greater than the power consumed by functional transitions. Since the power consumption of glitches can be considerable, it is important to take the power consumption of glitches into account during analysis and optimization. Failure to include the power consumption of glitches can lead to the inaccurate estimation of the design's power consumption.

Glitches can be determined by running a time-based simulation, with simulation vectors available for analysis. The analysis can take into account the actual pin-to-pin cell delays as well as wire delays. Simulators like VCS® from SYNOPSYS or PrimeTime PX-transient from SYNOPSYS can perform this type of calculation. These simulators also have models to perform glitch filtering: two opposing transitions close to each other in time get filtered when going through a combinational cell due to the fact that the cell cannot respond as fast. As described previously herein, gate level simulation vectors are hard to generate and are not practical to generate when designs are not finalized in early design stages.

For vectorless average power analysis, a user may typically provide activities for gate level netlist in a file, for example, in a switching activity interchange format (SAIF) file. Formats like SAIF (e.g., described in IEEE standard for design and verification of low-power, energy-aware electronic system (1801-2018)) can capture complete and incomplete glitch counts in addition to the functional toggle rates. If the SAIF file is generated from a simulator tool (e.g., VCS® from SYNOPSYS or PrimeTime PX from SYNOPSYS) from gate-level netlist simulation, the time-based simulation can capture functional toggles are well as glitch toggles. The glitch toggles can be represented as a toggle count (TC), a glitch toggle count (TG), and inertial toggles (IG) in the SAIF file. An average dynamic power including glitch power can be determined by reading the SAIF file.

In some aspects, the file is a register transfer level (RTL) SAIF file that has no (or minimal) glitch information as the flip-flop outputs and primary inputs to the system never glitches by construction. Any activity propagation engine used to calculate activity on intermediate combinational nodes may be augmented to take into account glitches (i.e., generate, propagate, filter glitches). Glitch activities are estimated in addition to the calculation of the functional activities on the nets when doing gate level activity propagation on combinational cells. Once both the functional and glitch activities are determined on all the nets, functional dynamic power and glitch dynamic power are determined.

Next, glitch activities estimation on combinational cell outputs is described. Particularly, since inertial glitches do not generate a toggle on the output of a cell (due to its defining property), transport glitch estimation is determined.

In some embodiments, glitch toggles estimation is based on a binary decision diagram (BDD) function evaluation. For a given combinational logic including input logic, output logic is evaluated based on BDD functionality. If the input net's activity value is expressed in terms of static probability (Sp) (i.e., probability of binary 1 or binary 0) and toggle rate (Tr), then BDD can be used to estimate output net activity in terms of (Sp, Tr). Although, glitch toggles estimation based on BDD function evaluation may not be as accurate as time-based simulation which has actual event vectors, the glitch toggles estimation is an acceptable estimation on the activity.

In some embodiments, Monte-Carlo style zero delay simulation for vectorless average power analysis may be used with SAIF with activity information such as Sp and Tr. The Monte-Carlo style zero delay simulation involves thousands of iterations hence it is runtime expensive. In contrast, BDD estimation is a one-shot estimate for one cell at a time, one time calculation without need of iterations and is therefore suitable for fast estimation and incremental activity updates.

In some embodiments, a combinational cell C may have inputs $A_i$ with i=1 ... n and output Z. Assume for each input $A_i$ the triple (SP(i), TR(i), TG(i)) is known. Zero delay simulation threaded (ZDST) is used to determine (SP(z), TR(z)) and use the propagation model described herein to calculate TG(z).

Note that formulas derived using conventional BDD methods assume pulses can be infinitely small and are distributed continuously in time. For example, for the two-port XOR gate Z=XOR (A, B), the BDD formulation gives: TR(Z)=TR(A)+TR(B). Any input toggle is propagated through. Thus, toggles never cancel each other out in the model. From a glitch propagation perspective, this may be too pessimistic.

If considering pulse width, and the possibility that the two input pins pulses may happen at the same time, the above formula is adjusted, which is called a rate limited BDD.

Examples for some common gates:

For $Z=XOR(A,B), TP(Z)=TP(A)+TP(B)-2\times TP(A)\times TP(B)$.

For $Z=AND(A,B), TP(Z)=SP(B)\times TP(A)+SP(A)\times TP(B)-0.5\times TP(A)\times TP(B)$.

For $Z=OR(A,B), TP(Z)=(1-SP(B))\times TP(A)+(1-SP(A))\times TP(B)-0.5\times TP(A)\times TP(B)$.

These formulations are using TP which means toggle per clock period. So TP=TR×T, where T is a clock period. Note that in all cases, the terms linear in TP correspond to the result of the textbook or conventional non-rate-limited BDD formulation. The TP(A)×TP(B) terms are correction terms which account for simultaneous toggles.

In some embodiments, the formulation may include terms having three TPs when the design includes two or more pins. The three TP terms correct for three simultaneous toggles.

In general, for an arbitrary logical function F for variables Xi . . . , TP can be derived as described above. The terms may be split into linear parts (LPs) and nonlinear parts (NLPs).

$$Z=F(Xi \ldots)$$

$$TP(Z)=LP(SP(Xi)\ldots,TP(Xi)\ldots)+ \\ NLP(SP(Xi)\ldots,TP(Xi)\times TP(Xj)\ldots,TP(Xi)\times \\ TP(Xj)\times TP(Xk)\ldots,\ldots) \qquad (1)$$

The LP of equation (1) represents the non-rate-limited BDD formulation. The NLP of equation (1) accounts for simultaneous toggles.

Given the above general formulation (1) of TP as a sum of a linear part LP and a non-linear part NLP, a general formula for glitch generation, propagation, and elimination can be derived as described below.

The following symbols are used in the derivation:
T=clock period; t=cell inertial delay; TR(x)=functional toggle rate on net x; TG(x)=glitch toggle rate on net x; TT(x)=total toggle rate on net x (functional+glitch); and $$TT(x)=TR(x)+TG(x).$$

TR may be calculated using a zero cell delay simulation width. The relationship between TP and TR is then given as TP=TR×T. The following rate-limited formulation may be used to determine TR:

$$TR(Z)=LP(SP(Xi) \ldots, T \times TR(Xi) \ldots)/T + NLP(SP(Xi) \ldots, T^2 \times TR(Xi) \times TR(Xj) \ldots, T^3 TR(Xi) \times TR(Xj) \times TR(Xk) \ldots, \ldots)/T$$

$$TR(Z)=LP(SP(Xi) \ldots, TR(Xi) \ldots) + NLP(SP(Xi) \ldots, T \times TR(Xi) \times TR(Xj) \ldots, T^2 TR(Xi) \times TR(Xj) \times TR(Xk) \ldots, \ldots) \quad (2)$$

TT can be derived using rate-limited at t instead of T.

In some embodiments, rate-limiting at t is assumed to simulate the effect of cancellation of signals due to the signals being closer than the inertial cell delay.

$$TT(Z)=LP(SP(Xi) \ldots, TT(Xi) \ldots) + NLP(SP(Xi) \ldots, t \times TT(Xi) \times TT(Xj) \ldots, t^2 TT(Xi) \times TT(Xj) \times TT(Xk) \ldots, \ldots) \quad (3)$$

Equation (3) is equivalent to equation (2) with T replaced by t and TR replaced by TT. Expanding the linear part of equation (3), using TT=TR+TG, gives:

$$TT(Z)=LP(SP(Xi) \ldots, TR(Xi) \ldots) + LP(SP(Xi) \ldots, TG(Xi) \ldots) + NLP(SP(Xi) \ldots, t \times TT(Xi) \times TT(Xj) \ldots, t^2 \times TT(Xi) \times TT(Xj) \times TT(Xk) \ldots, \ldots)$$

Subtracting equation (2) from equation (3) gives:

$$TG(Z)=LP(SP(Xi) \ldots, TG(Xi) \ldots) - NLP(SP(Xi) \ldots, T \times TR(Xi) \times TR(Xj) \ldots, T^2 TR(Xi) \times TR(Xj) \times TR(Xk) \ldots, \ldots) + NLP(SP(Xi) \ldots, t \times TT(Xi) \times TT(Xj) \ldots, t^2 TT(Xi) \times TT(Xj) \times TT(Xk) \ldots, \ldots) \quad (4)$$

In equation (4), the glitch generation term is subtracted and the glitch filtering term is added which is due to the NLP being in general.

In equation (4), the first part "LP(SP(Xi) . . . , TG(Xi) . . . )" is a linear function of each input pin's glitch toggle rate, TG(Xi). Hence, the first part may be referred to as the "glitch propagation". The BDD formula provides the actual LP function, which indicates how much percent of the input glitches can be propagated to output. For example, for XOR, the LP=1. That means 100% of the glitch toggles on input can be propagated to output.

In equation (4), the second part (i.e., NLP(SP(Xi) . . . , T×TR(Xi)×TR(Xj) . . . , T²TR(Xi)×TR(Xj)×TR(Xk) . . . , . . . )) is non-linear formulation of input pins' functional toggle rate and clock period T. The second part may be referred to as a glitch generation. The third part (i.e., NLP(SP(Xi) . . . , t×TT(Xi)×TT(Xj) . . . , t²TT(Xi)×TT(Xj)×TT(Xk) . . . , . . . )) is also a non-linear formulation, based on input pins' total toggle rate (functional+glitch), and time t. The third part may also be referred to as glitch elimination.

Note that the above description assumes no information about timing windows is available.

In the above equations, the terms t×TT(Xi)×TT(Xj) are the rates at which two-input events within an inertial cell delay t happen. The terms t²×TT(Xi)×TT(Xj)×TT(Xk) are the rates at which three-input events within an inertial cell delay t happen.

Using the approach above, equations may be derived for four-input events and higher.

In some embodiments, the equations and expressions for the rates can be refined when timing windows information are available as described below. Timing windows information may be acquired from timing tools such as PrimeTime PX-transient from SYNOPSYS. Timing windows information may include the minimum and maximum arrival time for each signal. The terms t×TT(Xi)×TT(Xj) is replaced by T×factor(Xi, Xj)×TT(Xi)×TT(Xj), where factor(Xi, Xj) is the probability that toggles on input pins Xi and Xj are within an inertial cell delay t. The terms t²×TT(Xi)×TT(Xj)×TT(Xk) is replaced by T²×factor(Xi, Xj, Xk)×TT(Xi)×TT(Xj)×TT(Xk), where factor(Xi, Xj, Xk) is the probability that toggles on input pins Xi, Xj and Xk are within an inertial cell delay t. The calculation of "factor" term is described further below. Thus, the general formula may be expressed as:

$$TG(Z)=LP(SP(Xi) \ldots, TG(Xi) \ldots) - NLP(SP(Xi) \ldots, T \times TR(Xi) \times TR(Xj) \ldots, T^2 TR(Xi) \times TR(Xj) \times TR(Xk) \ldots, \ldots) + NLP(SP(Xi) \ldots, T \times factor(Xi,Xj) \times TT(Xi) \times TT(Xj) \ldots, T^2 \times factor(Xi,Xj,Xk) \times TT(Xi) \times TT(Xj) \times TT(Xk) \ldots, \ldots) \quad (5)$$

FIG. 1A is a schematic that shows the possibilities for timing windows overlap in accordance with one embodiment of the present disclosure. The schematic illustrates the calculation of the factor between two inputs of a cell. The arrival of signal A at a first input pin may be represented on horizontal axis 102. The arrival of signal B at a second input pin may be represented on the vertical axis 104. Rectangle 106 displays the actual possibilities given the clock window. Area 108 can represent a combination of arrival times when signal A and signal B can influence each other, namely when they are separated by less than the inertial delay of the cell (minimal delay) from input to output.

Note that triangular areas 110 in the upper left and lower right represent the possibility that a toggle interferes with a toggle in the next or previous clock cycle.

The factor (A, B) can be defined as the ratio of the overlap area between the rectangle 106 and area 108. In some embodiments, the timing windows can cover the entire clock cycle. Then, factor (A, B)=t/T. Thus, the glitch formula is t×TT(A)×TT(B).

In some embodiments, the rectangle 106 may not overlap with the area 108. Then, input toggles are separated by at least an inertial cell delay, Factor (A, B)=0. There is no glitch filtering effect. However, the narrow timing window may have an effect of limiting the maximum possible toggle rate on a single signal.

In some embodiments, the rectangle 106 may completely overlap with the area 108. Thus, factor (A, B)=1 which indicates that maximum glitch filtering is occurring.

The formulation in (5) is the main formulation used in the model described herein, with use of timing window information described previously herein and illustrated in FIG. 1A. In FIG. 1A, the region inside rectangle 106 indicates the possible occurrence of actual arrival time pair $(t_A, t_B)$ for the two inputs. But, the static timing analysis may give quite pessimistic timing window for each signal. The timing window is bounded by a minimum and maximum of possible arrival times. The timing window tends to be quite large. Comparing to the inertial delay of the cell, which is the minimal delay among all the arcs from input A and B to output, the timing widow width usually is an order of magnitude larger than cell delay. Therefore, in FIG. 1A, a size of the rectangle 106 size may be much larger than the size of area 108. Hence the overlap region percentage of the rectangle 106 with the area 108 is low. This leads to a small timing window factor, and therefore a small portion of glitch filtering compared to glitch generation.

In some embodiments, if the timing window provided from the STA timing analysis is larger than the clock period, then a T wider than the clock period is used. For example, the expanded T may be double or triple the size of T because the toggles can happen beyond the clock period. Not using an expanded T may lead to under-estimation of glitch generation because the glitch toggles are generated outside the clock cycle.

In some embodiments, the actual arrival time of an input signal is not assumed to be uniformly distributed in the timing window. Instead, there is a higher probability that actual arrival time is around the midline of the timing window.

Figure 1B:
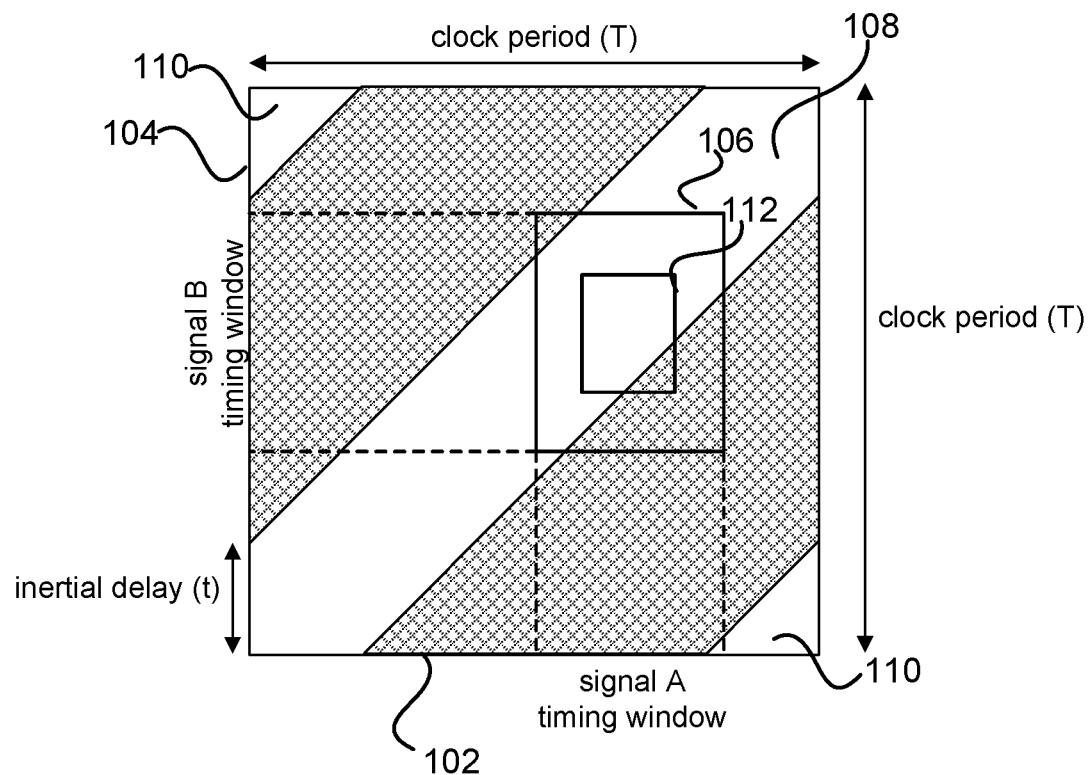
FIG. 1B illustrates an adjusted timing window, in accordance with an embodiment of the present disclosure.

FIG. 1B illustrates an adjusted timing window, in accordance with an embodiment of the present disclosure. A concentrated timing window 112 or adjusted timing windows may be determined. The concentrated timing window 112 may be represented as a smaller box inside the rectangle 106. The concentrated timing window 112 includes the area having a high probability density for actual arrival times. The concentrated timing window 112 is used to calculate the overlap with the area 108 to determine the concentrated timing window factor. This can dramatically reduce the pessimistic in glitch estimation.

In some embodiments, the period T is adjusted (i.e., can be larger than clock period) for possible glitch generation region as described above. Further, the "concentrated" timing window is used to calculate adjusted timing window factor for glitch filtering. This can avoid over-estimation as well as under-estimation.

Figure 2:
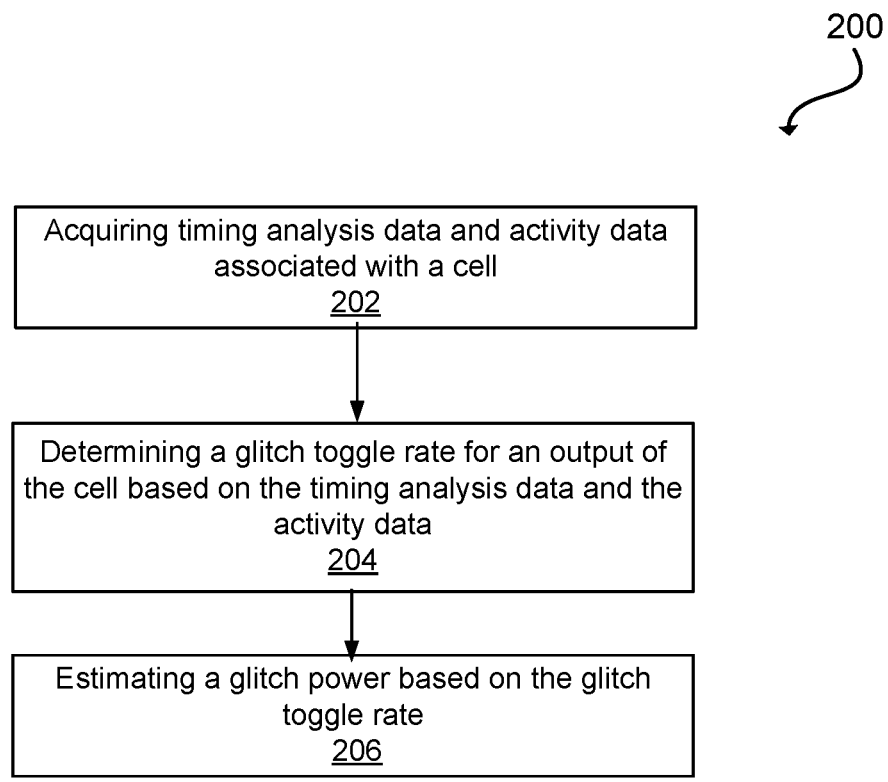
FIG. 2 illustrates a flowchart for a process to estimate glitch power, in accordance with an embodiment of the present disclosure.

FIG. 2 depicts a flowchart 200 for estimating glitch power in accordance with an embodiment of the present disclosure.

In 202, timing analysis data associated with a cell of a design may be acquired. In addition, activity data of one or more inputs of the cell may be acquired. The timing analysis data includes all cell pins arrival time. Activity data may be acquired from activity file SAIF, or tool's functional activity propagation, or both.

In 204, a glitch toggle rate for an output of the cell is determined based on the activity data of the one or more inputs of the cell and the timing analysis data. The activity data may include the static probability and the toggle rate of one or more inputs of the cell. In some embodiments, the glitch toggle rate is determined based on BDD representing a function of the cell. In some embodiments, the glitch toggle rate is adjusted using a correction term to account for two or more simultaneous toggles on inputs of the cell.

In 206, a glitch power based on at least the glitch toggle rate is estimated.

Figure 3:
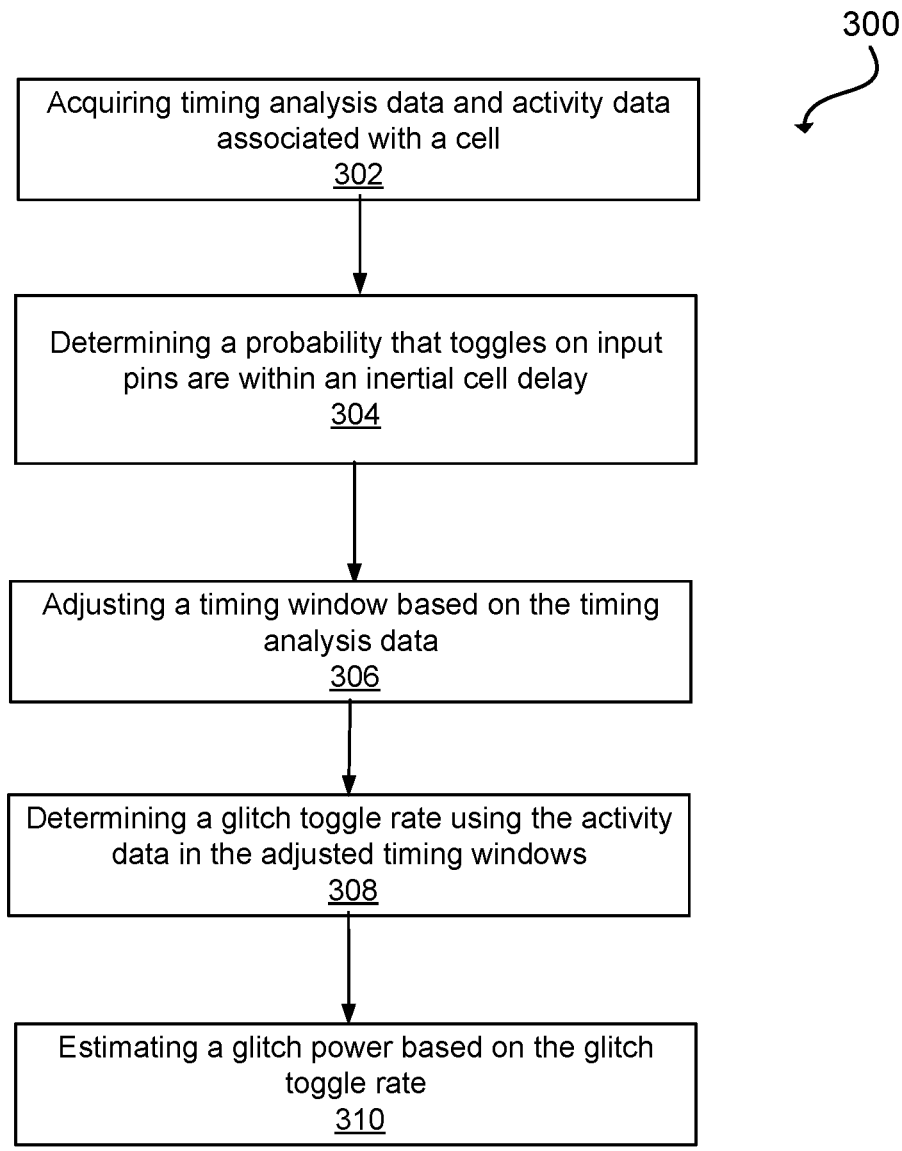
FIG. 3 illustrates a flowchart for a process to estimate glitch power, in accordance with an embodiment of the present disclosure.

FIG. 3 depicts a flowchart 300 for estimating glitch power in accordance with an embodiment of the present disclosure.

In 302, timing analysis data associated with a cell of a design and activity data of one or more inputs of the cell may be acquired.

In 304, a timing window for each input signal of the cell is determined based on the timing analysis data. Then, a first area representing the actual possibilities (i.e., actual arrival times of signal A and signal B) is identified. A second area is identified based on the inertial delay of the cell. The overlap area between the first area and the second area is determined. The overlap area represents the factor (A, B). The factor (A, B) is the probability that toggles on input pins A and B are within the inertial delay of the cell as described previously herein. Arrival times in the overlap area can cancel each other. Thus, glitch toggles in the overlap area can be eliminated.

In 306, a concentrated or adjusted timing window may be determined. The timing window for each signal may be adjusted based on the timing analysis data. In some embodiments, the timing window for a signal may be compared to a threshold value. In response to determining that the timing window is larger than the threshold value, then a concentrated timing window is determined and used in the determination of the probability that toggles on the input pins are within the inertial cell delay. In response to determining that the timing window is equal or less than the threshold value then the concentrated timing window is not determined and the factor determined in step 304 is used. The threshold value may be a function of the clock period, the inertial cell delay or a fixed value. For example, the threshold value may be equal to twice the inertial cell delay.

In some embodiments, the timing window may be a function of the midline of the timing window of signal A and signal B. For example, the concentrated timing window boundary may be the midline of the timing window ±20% of the clock period, or the original timing window determined at step 304. In some embodiments, the width of the concentrated timing window may be fixed. In some embodiments, the width of the concentrated timing window may be based on the cell delay. For example, the width of the concentrated timing window may be between 2 to 5 times the inertial cell delay. In some embodiments, the width of the concentrated timing window may be between 20% to 40% of the clock period.

In some embodiments, the width of the concentrated timing window may be a function of the dimension of the timing window determined at 304. For example, the timing window may be scaled down to obtain the concentrated timing window. The timing window for each signal may be adjusted. The adjusted timing window for each signal may be used to determine the first area and consequently the overlap between the first area and the second area. In some embodiments, the first area determined in 304 may be scaled down. The scaled down area may be used to determine the overlap area. The overlap area is between the scaled down first area and the second area.

In 308, a glitch toggle rate for an output of the cell is determined based on the activity data of the one or more inputs of the cell using the adjusted timing window or windows.

In 310, a glitch power based on at least the glitch toggle rate is estimated. In some embodiments, the steps 302-310 are repeated for all the nets in a design. Then, the total functional dynamic power and glitch dynamic power are determined based on the functional and glitch activities of all the nets.

It should be understood that some of the above steps of the flow diagram of FIG. 3 can be executed or performed in an order or sequence other than the order shown and described in the figure. Further, some of the above steps may be performed well in advance of other steps, or may be executed or performed substantially simultaneously or in parallel.

In some embodiments, glitches are propagated for a predetermined number of levels (e.g., two or three levels). For example, a glitch generated at an output of a first cell may be propagated to two other cells. Thus, the second cell may have the generated glitch and the propagated glitch of the first cell. The propagated glitch may not generate additional glitches after two levels. For example, functional toggles are considered and glitch toggles when calculating glitches. However, glitch toggles that are propagated for more than two levels are not counted. This minimize the undesired accumulation of the glitches and provide a more accurate glitch count.

In one example, the vectorless glitch estimation method described herein is implemented using Fusion Compiler (FC) (also ICC2) from SYNOPSYS. It allows the user to estimate glitch for a whole design using the SAIF activity file and the internal timing analysis. Correlation tests were performed to compare glitch estimation using the method described herein with VCS or PTPX vector based glitch calculation.

In one example, in reference flow RTL vector events are stored in RTL fsdb file. The RTL vector events is used with a gate level netlist to run VCS (or PTPX) vector based simulation. Two runs are performed. A first run with zero-delay is used to get a first total power number P1. Another run with full standard delay format (sdf) delay is used to obtain a second power number P2. The difference between the first power number and the second power number (P2−P1) is the glitch power. In the zero-delay run, VCS or PTPX output a zero-delay SAIF files. The zero-delay SAIF stores functional activities (probability and toggle rate) for each gates. In test flow, the zero-delay SAIF to feed into FC, and turn on FC's glitch estimation. FC's estimated glitch power with reference flow is compared with calculated glitch power (P2-P1) to show the correlation results.

Table 1 and table 2 show the glitch correlation test results. In table 1 and table 2, "Method 1" refers to the method described herein and "Method 2" refers to the method described herein using the concentrated" timing window and the adjusted period T as described above.

TABLE 1

Exemplary test results

| Design | Reference Glitch/total % | Method 1 | Method 2 |
|---|---|---|---|
| Design 1 | 0.35% | — | 0.064% |
| Design 2 | 5.7% | 30% | 5.8% |
| Design 3 | 43.42% | 69.4% | 44% |
| Design 4 | 12% | 302% | 13% |
| Design 5 | 29% | 47% | 19% |

TABLE 2

Exemplary test results

| Design | Reference Glitch Power | Method 2 | Difference |
|---|---|---|---|
| Design 6 | 33 mw | 38.7 mw | 1.17x |
| Design 7 | 0.107 mw | 0.196 mw | 1.8x |
| Design 8 | 46 uw | 61 uw | 1.25x |
| Design 9 | 76.05 mw | 102.05 mw | 1.3x |
| Design 10 | 110 mw | 594 mw | 5.4x |

Figure 4:
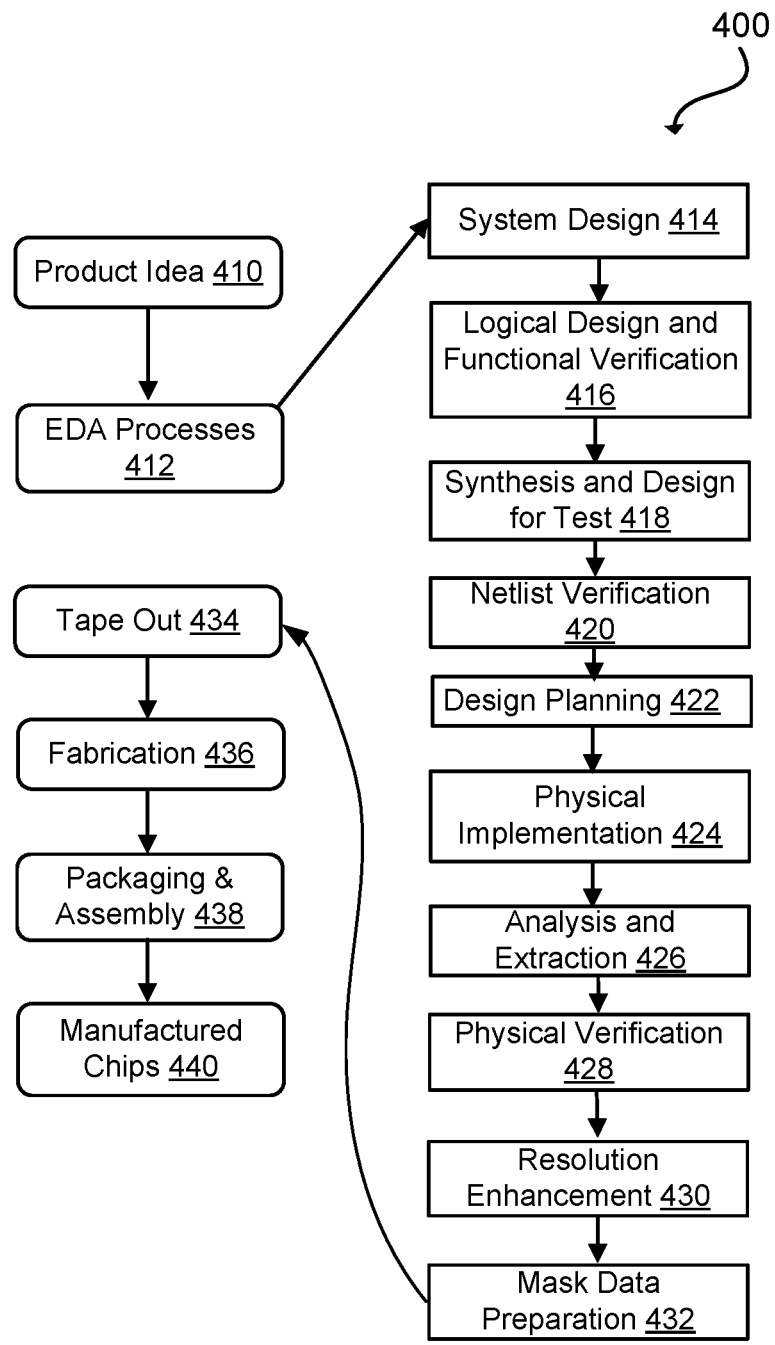
FIG. 4 illustrates a flowchart of various processes used during the design and manufacture of an integrated circuit in accordance with an embodiment of the present disclosure.

FIG. 4 illustrates an example set of processes 400 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 410 with information supplied by a designer, information which is transformed to create an article of manufacture that uses a set of EDA processes 412. When the design is finalized, the design is taped-out 434, which is when artwork (e.g., geometric patterns) for the integrated circuit is sent to a fabrication facility to manufacture the mask set, which is then used to manufacture the integrated circuit. After tape-out, a semiconductor die is fabricated 436 and packaging and assembly processes 438 are performed to produce the finished integrated circuit 440.

Specifications for a circuit or electronic structure may range from low-level transistor material layouts to high-level description languages. A high-level of representation may be used to design circuits and systems, using a hardware description language ('EIDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 4. The processes described can be enabled by EDA products (or tools).

During system design 414, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 416, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 418, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 420, the netlist is checked for compliance with timing constraints and for correspondence with the HDL code. During design planning 422, an overall floor plan for the integrated circuit is constructed and analyzed for timing and top-level routing.

During layout or physical implementation 424, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 426, the circuit function is verified at the layout level, which permits refinement of the layout design. During physical verification 428, the layout design is checked to ensure that manufacturing constraints are correct, such as DRC constraints, electrical constraints, lithographic constraints, and that circuitry function matches the HDL design specification. During resolution enhancement 430, the geometry of the layout is transformed to improve how the circuit design is manufactured.

During tape-out, data is created to be used (after lithographic enhancements are applied if appropriate) for production of lithography masks. During mask data preparation 432, the 'tape-out' data is used to produce lithography masks that are used to produce finished integrated circuits.

A storage subsystem of a computer system (such as computer system 500 of FIG. 5) may be used to store the programs and data structures that are used by some or all of the EDA products described herein, and products used for development of cells for the library and for physical and logical design that use the library.

Figure 5:
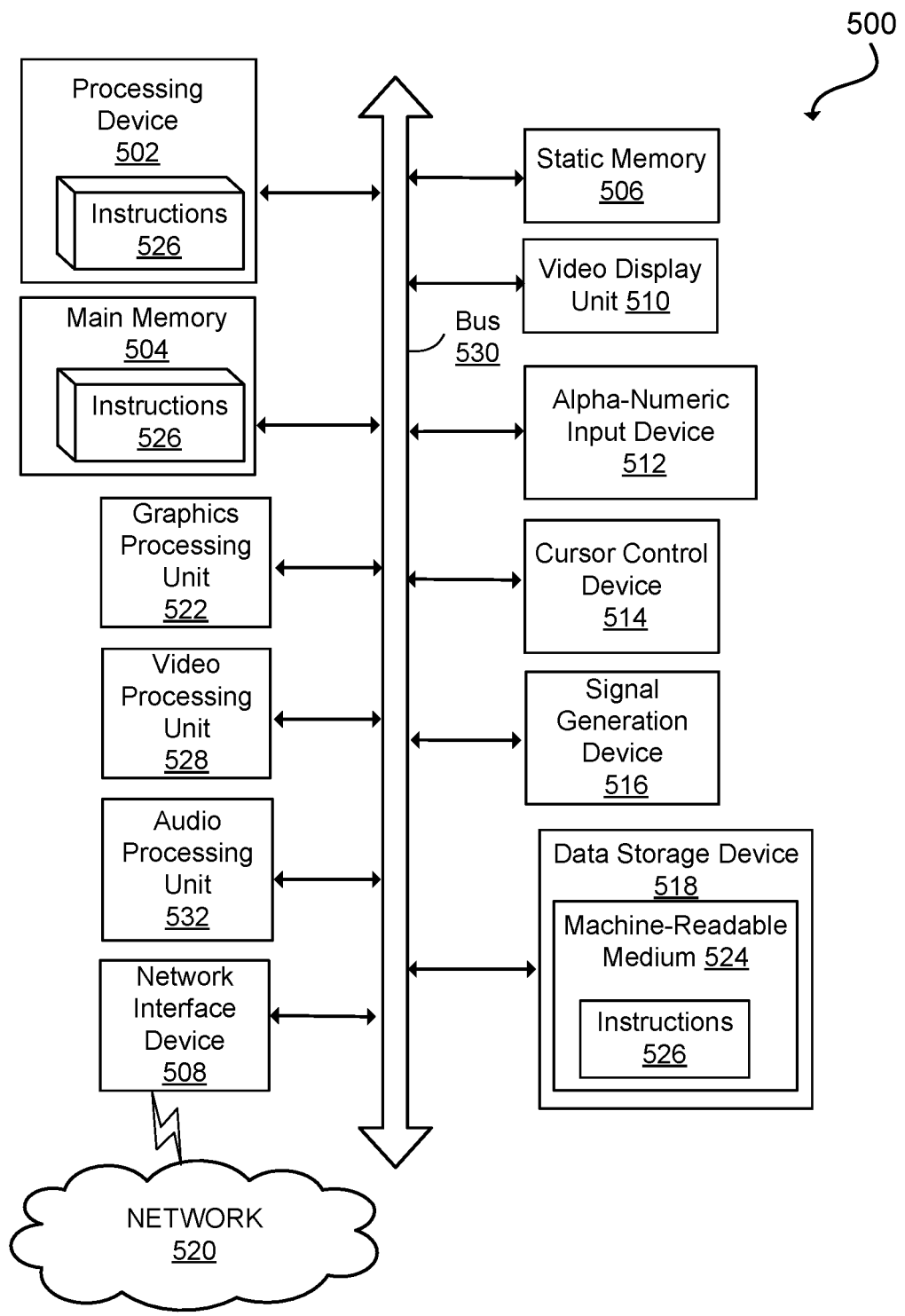
FIG. 5 illustrates an abstract diagram of an example computer system in which embodiments of the present disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 526 for performing the operations and steps described herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a non-transitory computer-readable medium) on which is stored one or more sets of instructions 526 or software embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In some implementations, the instructions 526 include instructions to implement functionality corresponding to the present disclosure. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 502 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

The invention claimed is:

1. A method, comprising:
   acquiring timing analysis data associated with a cell of a design of an integrated circuit and activity data of one or more inputs of the cell;
   determining, by a processor, a glitch toggle rate for an output of the cell based on the activity data of the one or more inputs of the cell and the timing analysis data, wherein the determining the glitch toggle rate comprises:
      computing a total toggle rate for the cell using a stochastic simulation, based on static probabilities and toggle rates of the one or more inputs of the cell and based on an inertial delay of the cell;
      computing a functional toggle rate based on the one or more inputs of the cell; and
      computing the glitch toggle rate based on the total toggle rate and the functional toggle rate;
   adjusting the glitch toggle rate based on a correction term for two or more simultaneous toggles on inputs of the cell; and
   estimating, by the processor, a glitch power of the design of the integrated circuit based on at least the glitch toggle rate.

2. The method of claim 1, wherein the timing analysis data includes timing windows information, and wherein determining the glitch toggle rate further comprises:
   determining a probability that toggles on a first input and on a second input of the cell are within a cell delay based on the timing windows information.

3. The method of claim 1, wherein the activity data includes a static probability and a toggle rate of the one or more inputs of the cell.

4. The method of claim 1, wherein the glitch toggle rate is determined based on a binary decision diagram (BDD), the BDD representing a function of the cell.

5. The method of claim 1, further comprising:
   determining an overlap area between a first area representative of timing windows overlap of one or more input signals of the cell and a second area representative of arrival times of the one or more input signals when the one or more inputs signals of the cell influence each other; and
   adjusting the glitch toggle rate as a function of the overlap area.

6. The method of claim 1, further comprising:
   determining an expanded period when a width of a timing window exceeds a clock period.

7. The method of claim 1, further comprising:
   adjusting a timing window based on arrival times of input signals associated with the one or more inputs; and
   determining the glitch toggle rate for the output of the cell based on the activity data of the one or more inputs in the adjusted timing window.

8. The method of claim 7, wherein a width of the adjusted timing window is a function of a cell delay, a clock period, or a threshold value.

9. The method of claim 7, further comprising:
   scaling the timing window to obtain the adjusted timing window.

10. The method of claim 7, wherein the adjusted timing window includes an area of the timing window having a high probability density for the arrival times of the input signals associated with the one or more inputs of the cell.

11. The method of claim 1, further comprising:
   comparing a dimension of a timing window to a threshold value; and
   adjusting the timing window when the dimension of the timing window exceeds the threshold value.

12. The method of claim 1, wherein the glitch toggle rate includes functional toggles and glitch toggles propagated for two or less levels.

13. A system, comprising:
a memory storing instructions; and
a processor, coupled with the memory and to execute the instructions, the instructions when executed cause the processor to:
acquire timing analysis data associated with a cell of a design of an integrated circuit and activity data of one or more inputs of the cell;
determine a glitch toggle rate for an output of the cell based on the activity data of the one or more inputs and the timing analysis data, wherein the determining the glitch toggle rate comprises:
compute a total toggle rate for the cell using a stochastic simulation, based on static probabilities and toggle rates of the one or more inputs of the cell and based on an inertial delay of the cell;
compute a functional toggle rate based on the one or more inputs of the cell; and
compute the glitch toggle rate based on the total toggle rate and the functional toggle rate;
adjust the glitch toggle rate based on a correction term for two or more simultaneous toggles on inputs of the cell; and
estimate a glitch power of the design of the integrated circuit based on at least the glitch toggle rate.

14. The system of claim 13, wherein the timing analysis data includes timing windows information, and wherein the processor is further configured to:
determine a probability that toggles on a first input and on a second input of the cell are within a cell delay based on the timing windows information.

15. The system of claim 13, wherein the activity data includes a static probability and a toggle rate of the one or more inputs of the cell.

16. The system of claim 13, wherein the glitch toggle rate is determined based on a binary decision diagram (BDD), the BDD representing a function of the cell.

17. The system of claim 13, wherein the processor is further configured to:
adjust a timing window based on arrival times of input signals associated with the one or more inputs; and
determine the glitch toggle rate for the output of the cell based on the activity data of the one or more inputs in the adjusted timing window.

18. A non-transitory computer readable medium comprising stored instructions, which when executed by a processor, cause the processor to:
acquire timing analysis data associated with a cell of a design of an integrated circuit and activity data of one or more inputs of the cell;
determine a glitch toggle rate for an output of the cell based on the activity data of the one or more inputs and the timing analysis data, wherein the determining the glitch toggle rate comprises:
computing a total toggle rate for the cell using a stochastic simulation, based on static probabilities and toggle rates of the one or more inputs of the cell and based on an inertial delay of the cell;
computing a functional toggle rate based on the one or more inputs of the cell; and
computing the glitch toggle rate based on the total toggle rate and the functional toggle rate;
adjust the glitch toggle rate based on a correction term for two or more simultaneous toggles on inputs of the cell; and
estimate a glitch power of the design of the integrated circuit based on at least the glitch toggle rate.

* * * * *